United States Patent
Jones

(10) Patent No.: US 11,795,278 B2
(45) Date of Patent: Oct. 24, 2023

(54) MINERAL FIBER BASED COMPOSITES

(71) Applicant: KNAUF INSULATION SPRL, Vise (BE)

(72) Inventor: Gareth Jones, Prescot-Merseyside (GB)

( * ) Notice: Subject to any disclaimer, the term of this patent is extended or adjusted under 35 U.S.C. 154(b) by 115 days.

(21) Appl. No.: 16/955,416

(22) PCT Filed: Dec. 18, 2018

(86) PCT No.: PCT/EP2018/085541
§ 371 (c)(1),
(2) Date: Jun. 18, 2020

(87) PCT Pub. No.: WO2019/121713
PCT Pub. Date: Jun. 27, 2019

(65) Prior Publication Data
US 2021/0179791 A1    Jun. 17, 2021

(30) Foreign Application Priority Data
Dec. 19, 2017   (GB) ...................... 1721306

(51) Int. Cl.
*C08J 5/04* (2006.01)
*C08L 1/28* (2006.01)

(52) U.S. Cl.
CPC ............. *C08J 5/0405* (2021.05); *C08J 5/043* (2013.01); *C08L 1/286* (2013.01); *C08J 2301/26* (2013.01); *C08L 2201/54* (2013.01)

(58) Field of Classification Search
CPC .. C08L 1/28; C08L 1/284; C08L 1/286; C08J 5/0405; C08K 7/04; C08K 7/08; C08K 7/10
See application file for complete search history.

(56) References Cited

U.S. PATENT DOCUMENTS

| | | |
|---|---|---|
| 3,952,130 A | 4/1976 | Nason |
| 4,957,559 A | 9/1990 | Tiesler et al. |
| 6,677,261 B1 | 1/2004 | Addiego et al. |
| 2010/0330376 A1* | 12/2010 | Trksak ................. C08J 5/045 428/533 |
| 2014/0165877 A1 | 6/2014 | Gane et al. |
| 2014/0165879 A1 | 6/2014 | Gane et al. |
| 2017/0174915 A1 | 6/2017 | Rolin et al. |
| 2017/0198142 A1 | 7/2017 | Hampson et al. |
| 2017/0210952 A1 | 7/2017 | Hampson et al. |

FOREIGN PATENT DOCUMENTS

| | | | |
|---|---|---|---|
| EP | 2138475 A1 | 12/2009 | |
| JP | 2004051384 A | 2/2004 | |
| KR | 20070023651 A | 2/2007 | |
| WO | 9414885 A1 | 7/1994 | |
| WO | WO-9922084 A1 * | 5/1999 | ............. E04B 1/74 |
| WO | 2008117611 A1 | 10/2008 | |
| WO | 2011106232 A2 | 9/2011 | |
| WO | WO-2011106232 A2 * | 9/2011 | ......... C04B 38/0006 |
| WO | WO-2016009062 A1 * | 1/2016 | ............. B27K 3/02 |
| WO | WO-2017194725 A2 * | 11/2017 | ............. A01G 24/15 |

OTHER PUBLICATIONS

Heiko Thielking & Marc Schmidt, "Cellulose Ethers," 7 Ullmann's Encyclopedia of Industrial Chemistry 381-397, published online 2006. (Year: 2006).*

* cited by examiner

*Primary Examiner* — Liam J Heincer
(74) *Attorney, Agent, or Firm* — Knauf Insulatiom, Inc.; James K. Blodgett

(57) ABSTRACT

The present disclosure provides for binder compositions comprising cellulose ethers, as well as insulation articles and products comprising the same.

9 Claims, No Drawings

MINERAL FIBER BASED COMPOSITES

CROSS-REFERENCE TO RELATED APPLICATIONS

This application is a U.S. national counterpart application of International Application Serial No. PCT/EP2018/085541, filed Dec. 18, 2018, under 35 U.S.C. 371, which claims priority to GB Application Serial No. 1721306.7, filed Dec. 19, 2017, the disclosures of which are hereby incorporated herein by reference.

BACKGROUND OF THE INVENTION

The present disclosure provides for composite products comprising mineral fibers and mineral particles selected from the group consisting of glass fibers/fiberglass, glass wool, stone wool, sand particles, woven fibers, non-woven fibers, particles of refractory material, coatings, abrasives and refractory elements, as well as binder compositions for use in such products.

Phenolformaldehyde has historically been incorporated into binder formulations utilized in the production of insulation articles and compositions. However, formaldehyde free binders have recently been reported, including binders based on 1) polyester chemistry comprising a polyacid component, an anhydride and/or salt derivative thereof, and a polyhydroxy component; and 2) the condensation of inorganic acid ammonium salts, polycarboxylic acids or amines/polyamines with reducing sugars serving as thermosettable components or "thermosets."

The use of formaldehyde free binders is preferable due to the reduced health and environmental risks associated with their production and use. However, these binders may be more costly and challenging to produce.

SUMMARY OF THE INVENTION

The present disclosure provides for insulation articles and compositions comprising formaldehyde free binder compositions, including aqueous, curable binder compositions. In some embodiments, the binder compositions described herein beneficially comprise chemical components such as cellulose based polymers that reduce production costs and toxicity risks, and are therefore more environmentally friendly, than similar binder compositions comprising formaldehyde.

DETAILED DESCRIPTION OF THE INVENTION

As used herein, the term "binder composition" refers to all chemicals and ingredients applied to the solid matter (or simply "matter") to be bound and/or present on the solid matter to be bound, including prior to curing, (other than the matter and any inherent and/or endogenous moisture comprised within the solid matter) including reactants, solvents (including water), reaction product(s) and any additives, including optional additives, that may be formulated into the composition as further described herein.

The term "binder" is used herein to designate a thermoset and/or thermosettable binder resin resulting from the production of a "binder composition" as further described herein.

In accordance with the present disclosure, the term "cured" means that the components of the binder composition have been subjected to conditions that lead to chemical change, such as covalent bonding, hydrogen bonding and chemical crosslinking, which may increase the cured product's durability and solvent resistance, and result in a thermoset material, composition and/or article.

As used herein, the term "dry weight of the binder composition" refers to the weight of all components of the binder composition excluding any water or solvent that may be present including, e.g. liquid water and/or water of crystallization.

The term "cellulose ether" as used herein refers generally to cellulose-based polymers, including alkyl cellulose, methylcellulose, ethylcellulose, hydroxyalkyl cellulose, hydroxyethyl cellulose, hydroxypropyl cellulose, hydroxyethyl methyl cellulose, hydroxypropyl methyl cellulose, carboxyalkyl cellulose, carboxymethylcellulose and salts thereof, such as sodium carboxymethylcellulose. Most cellulose ethers are advantageously soluble in water and may be used to modify the rheological properties of chemical compositions. Cellulose ethers are commercially used in processed food and feeds, pharmaceutical products, paints, concretes, cements, cosmetics and adhesives. Cellulose ethers are advantageously capable of "self-forming" thermoset resin binders by themselves. For instance, at low pH levels a binder solution comprising carboxymethylcellulose (CMC) may form crosslinks via lactonization reactions between carboxylic acid groups and free hydroxyl groups. Accordingly, as disclosed herein cellulose ethers may beneficially be incorporated into the binder compositions of the instant application to bind fibrous, particulate and related materials for producing insulation articles, products and compositions.

As would be appreciated by those of skill in the relevant chemical arts, the properties of the disclosed cellulose ethers may vary significantly, for instance, depending on variables such as the type of chemical substituents present on the hydroxyl function, the degree of chemical substitution and/or the degree of polymerization.

As would be further appreciated by the skilled artisan, aqueous solutions of cellulose ethers may be characterized by non-Newtonian behavior, and accordingly the viscosity of the disclosed binder solutions may vary as a function of the molecular weight of the cellulose ether(s) present in the solutions, as well as one or more of the pH, temperature, agitation/sheer thinning and/or concentration of the solution or chemical components comprising the same. In accordance with the knowledge available to the skilled artisan, the concentration of the one or more cellulose ether(s) in the disclosed aqueous binder compositions may be manipulated, i.e. increased or decreased, depending on the application, for example to maximize the sprayability of the binder compositions onto a fiber or particulate substrate.

In some embodiments, the degree of substitution of the hydroxyl groups in the cellulose ether compounds varies from 0.20-3.00, including 0.30, 0.40, 0.50, 1.00, 1.50, 2.00 and 2.50.

In further embodiments, a cellulose ether for use in the disclosed binder compositions may comprise a molecular weight (MW) of 80,000 Daltons (Da) or less, including 70,000 Da or less, 60,000 Da or less and 50,000 Da or less, including about 40,000 Da.

Due to their non-Newtonian properties, cellulose ether solutions may comprise high viscosities depending on characteristics such as the molecular weight of the cellulose ethers incorporated therein, operating temperature, pH, sheering and other conditions. However, in accordance with the present disclosure it has been found that low concentrations of low molecular weight cellulose ethers advantageously result in viscosities that allow for their use in binder preparation and, in certain embodiments, improve the performance of binders comprising the cellulose ether(s).

As described herein, in certain embodiments composite products bonded by cellulose ether comprising binder compositions show improved bond strength, including under dry conditions and/or significantly increased cure rates as compared to certain formaldehyde free binders lacking one or more of the cellulose ethers described herein. For example, a binder composition comprising 2 wt. % sodium carboxymethylcellulose and comprising a molecular weight of less than 50,000 Da has been found to cure significantly faster (in certain instances, over a minute faster) than a 3 wt. % binder composition comprising 85 wt. % dextrose and 15 wt. % ammonium citrate.

In certain embodiments, the concentration of cellulose ether(s) in the disclosed binder compositions may comprise from 0.2-15.0 wt. % cellulose ether, including 0.5 wt. %, 1.0 wt. %, 5.0 wt. % and 10.0 wt. %, based on the total aqueous binder composition. In particular embodiments related to the manufacture of mineral wool insulation compositions and products, the solid content of the aqueous binder composition may comprise a range of 1.0-20 wt. %, including 1.0-15 wt. % and 5-10 wt. %, based on the total weight of the aqueous binder composition.

In some embodiments, the cellulose ether comprising binder compositions described herein may be used in the manufacturing of composite products, such as woven and non-woven mineral fibers, including compositions, products and articles comprising glass fibers and mineral wool fibers. In related embodiments, mineral fibers such as mineral glass wool fibers and stone wool fibers may be bound by the binder compositions disclosed herein and used for manufacturing thermal and acoustic insulating materials. In embodiments related to the production of a fiber mat, such as fiber mats for use in the production of insulating products, an aqueous binder composition may be applied onto the fibers, e.g. by spraying, and the binder-impregnated mineral fibers may be deposited and assembled as a mat and subjected to sufficient heat for the curing of the binder composition for forming an assembly of bonded fibers.

In further embodiments, the cellulose ether binder compositions disclosed herein may be used to produce and manufacture abrasive materials and products from mineral particles such as sand. In still further embodiments, the disclosed binder compositions may be used in the production of refractory elements and coatings produced from refractory particles, as well as products and articles comprising the same.

In some embodiments, the disclosed binders, and compositions and articles comprising these binders, are characterized by improved performance, such as improved mechanical performance under dry conditions, at beneficially low cellulose ether concentrations.

While in no way limiting the disclosed technology to any particular theory, it is believed that the cellulose ether crosslinks with itself at high temperatures, which advantageously increases binder strength. The degree of chemical substitution in the cellulose ether(s), i.e. the average number of hydroxyl group substituents per anhydroglucose unit, is believed to influence these crosslinking interactions.

In certain embodiments, the binder compositions disclosed herein may further comprise additives that beneficially improve the performance of the binder, such as improving the mechanical strength of the binder under wet conditions. In related embodiments, ammonium salts, ammonium salts of inorganic acids, ammonium phosphate, ammonium nitrate, ammonium sulfate and azetidinium compounds may be incorporated into the binder compositions of the instant disclosure.

Azetidinium compounds, including multifunctional azetidinium compounds, may be produced using different coupling agents and amine functional monomers at varying ratios. These compounds comprise at least one substituted or unsubstituted four-membered, nitrogen containing heterocycle. When used as a functional group, the azetidinium group may be chemically bonded with a homopolymer or a copolymer chain comprising one or more non-azetidinium monomer units. In some embodiments, an azetidinium based material for use in the disclosed technology comprises at least two azetidinium groups in the polymeric chain and comprises the following general structure:

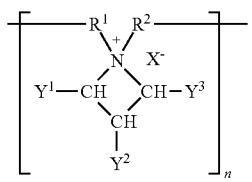

wherein n comprises an integer greater than or equal to 1, $R_1$ comprises a $C_1$-$C_{25}$ alkanediyl group, such as a $C_1$-$C_{10}$ alkanediyl group and a $C_1$-$C_5$ alkanediyl group optionally comprising one or more hydroxyl, carboxyl and/or amine substituents, $R_2$ comprises a chemical group and/or substituents as defined by $R_1$, or comprises an —$R_3$—NH—C(O)—$R_4$— group, wherein $R_3$ and $R_4$ independently comprise a $C_1$-$C_{25}$ alkanediyl group, such as a $C_1$-$C_{10}$ alkanediyl group and a $C_1$-$C_5$ alkanediyl group, $Y_1$ and $Y_3$ are selected from the group consisting of a hydrogen (H) group and a $C_1$-$C_5$ alkyl group optionally comprising one or more hydroxyl, amine and/or carboxyl groups, $Y_2$ is selected from the group consisting of a hydroxyl (OH) group and a chemical group and/or substituents as defined by Y1, and $X^-$ comprises a halogen ion.

In certain embodiments, additives such as the polyazetidinium resin Hercules® CA1025 (Ashland Global Specialty Chemicals Inc., Covington, KY, USA) may be incorporated into the disclosed binder compositions.

In accordance with some embodiments of the instant disclosure, azetidinium functionalized polymers may comprise highly reactive quaternary ammonium groups that beneficially enhance certain properties of the disclosed binders, including but not limited to improved antimicrobial activity as compared to similar compositions lacking one or more azetidinium groups. While in no way limiting the present technology to any particular theory, it is believed that the reactivity of azetidinium functional groups is at least partially derived from its inherent angle strain. Accordingly, azetidinium functional groups are advantageously very reactive with nucleophilic compounds, and azetidinium compounds beneficially polymerize at elevated temperatures and/or via radical initiation.

In further embodiments, additives capable of improving the wet strength of the disclosed binder compositions may be present at a concentration of 0.5-20 wt. %, including 1 wt. %, 10 wt. % and 15 wt. %. For instance, in a non-limiting example a binder composition as disclosed herein comprising about 5 wt. % ammonium sulfate (($NH_4)_2SO_4$) as disclosed herein has been found to demonstrate improved mechanical strength.

In still further embodiments, the wet strength improvement additives disclosed herein may advantageously improve the wet strength of the disclosed binder compositions after test methods such as weathering in an autoclave and soaking, wherein composite material comprising a binder composition of the instant disclosure is soaked for about 10 minutes in a water bath at 80° C. In related embodiments, composite materials comprising a binder composition as disclosed herein beneficially recovers 70-90% of its initial dry bond strength following a drying period of 1-3 hours, including 1.25 hours, 1.5 hours, 2 hours, 2.25 hours, 2.5 hours and 2.75 hours.

In some embodiments, a binder composition as disclosed herein may further comprise a viscosity reducing agent comprising urea and/or derivatives thereof, biurea, thiourea, guanidine salts, sodium salts, sodium nitrate, sodium chloride, hydrochloric acid, calcium salts, calcium chloride, and sources of $Ca^{2+}$ and $Li^+$ ions.

In additional embodiments, the disclosed binder compositions may comprise viscosity reducing agents selected from the group consisting of amine compounds, inorganic and organic amines, compounds comprising at least one primary amine group, amine salts and compounds capable of generating amine compounds in situ. In certain embodiments, primary polyamine comprising the general formula $H_2N-Q-NH_2$ may be incorporated in the binder compositions of the instant disclosure, wherein Q comprises a chemical substituent selected from the group consisting of an optionally substituted alkyl, cycloalkyl, heteroalkyl, cycloheteroalkyl, $C_2$-$C_{24}$ alkyl, $C_2$-$C_9$ alkyl, $C_3$-$C_7$ alkyl, $C_6$ alkyl, cyclohexyl, cyclopentyl, cyclobutyl and benzyl group. In some embodiments, the primary polyamine may be selected from the group consisting of a diamine, triamine, tetraamine and pentamine. In further embodiments, the primary polyamine is selected from the group consisting of diethylenetriamine, 1-piperazineethaneamine bis(hexamethylene)triamine, triethylenetetramine, tetraethylenepentamine, 1,2-diaminoethane, 1,4-diaminobutane, 1,5-diaminopentane, 1,6-diaminohexane, 1,12-diaminododecane, 1,4-diaminocyclohexane, 1,4-diaminobenzene, diethylenetriamine, triethylenetetramine, tetraethylenepentamine, 1-piperazine-ethaneamine, 2-methyl-pentamethylenediamine, 1,3-pentanediamine, bis(hexamethylene)triamine, 1,8-diaminooctane, 1,6-diaminohexane (hexamethylenediamine (HMDA)), a polyether-polyamine, a diamine, a triamine, a polymeric polyamine, triaminodecanes, triaminononanes, triaminooctanes, triaminoheptanes, triaminohexanes, triaminopentanes and 4-(aminomethyl)-1,8-octanediamine. In still further embodiments, a triprimary triamine for use in the disclosed binders may comprise one or more spacer groups selected from the groups consisting of alkanediyls, heteroalkanediyls, alkenediyls, heteroalkenediyls, alkynediyls, heteroalkynediyls, linear alkanediyls, linear heteroalkanediyls, linear alkenediyls, linear heteroalkenediyls, linear alkynediyls, linear heteroalkynediyls, cycloalkanediyls, cycloheteroalkanediyls, cycloalkenediyls, cycloheteroalkenediyls, cycloalkynediyls and cycloheteroalkynediyls, any of which may optionally be branched and/or unbranched.

In some embodiments, the viscosity reducing agent(s) may be present in the binder composition at a weight ratio of 0.5 wt. %, such as 1 wt. %, up to 30 wt. %, including up to 25 wt. %, of the bulk binder composition. As would be appreciated by those of skill in the art, the concentration of the viscosity reducing agent incorporated into the binder compositions disclosed herein may be manipulated, i.e. increased or decreased, depending on the type of utility, composition, article, etc.

In additional embodiments, the binder compositions of the present disclosure may further comprise one or more adjuvants selected from the group consisting of waxes, dyes, dedusters and release agents. In further embodiments, the binder compositions may optionally comprise catalysts for promoting reactions between the reactive binder components, for instant the cellulose ether components.

In further embodiments, the disclosed binder compositions advantageously do not comprise any added and/or endogenous formaldehyde and accordingly may be regarded as "substantially formaldehyde free," i.e., the binder composition(s) evolves less than 5 ppm formaldehyde upon testing, drying and/or curing. In related embodiments, the disclosed binder compositions may be "formaldehyde free," i.e., the binder composition(s) evolves less than 1 ppm formaldehyde upon testing, drying and/or curing.

In certain embodiments, the disclosed binders may be used to bond a collection of non- or loosely-assembled fibrous matter selected from the group consisting of mineral fibers, slag wool fibers, stone wool fibers, glass fibers, aramid fibers, ceramic fibers, metal fibers and carbon fibers.

In some embodiments, the binder compositions disclosed herein may be used to produce insulation products such as thermal insulation products comprising mineral fibers. For instance, a collection of fibers may be bonded together to produce a fiberglass mat which may be further processed using production methods known in the relevant arts to produce an insulation product. In further embodiments, the concentration of fibers may be 70-99% by total weight (wt. %) of the insulation product, including 80-99 wt. % or from 85-99 wt. %.

In still further embodiments, an aqueous binder composition as disclosed herein may be applied to fibrous matter by spraying, rolling, mixing and/or tumbling applications. While in no way limiting the disclosed technology to any particular theory, it is believed that the binder compositions disclosed herein may form a gel that bonds fibrous and/or particulate material together when arranged into an assembly of matter in accordance with the instant disclosure. In additional embodiments, the binder composition may be cured following its application to a composition of matter at temperatures between ambient temperatures (about 15-25° C.) and 280° C.

The following examples exemplify certain embodiments of the disclosed binder compositions and compositions of matter/articles comprising the same.

EXAMPLES

Example 1. A binder composition for bonding of mineral fibers was prepared by mixing citric acid and a slight excess of ammonia in water, with the subsequent addition of dextrose to produce an ammonium citrate:dextrose weight ratio of 15:85. The resulting binder composition comprised a solids content of 1.4%.

Sample fibrous composition samples were prepared by cutting donut samples from a high-density rock mineral wool mat material using a donut cutter. The donuts were prepared using the same fiber orientation to ensure reliability and consistency of the results. The donuts were submerged into the binder composition until completely saturated for a time period of about 10 seconds, with excess binder drained off. The donuts were individually dried by wrapping them in tissue paper and individually microwaving the wrapped donuts for 2 minutes, 30 seconds on each side. The operation was repeated for 1 min 30 seconds on each side after turning over the donut and re-wrapping it in fresh tissue paper. The donuts were then unwrapped and microwaved/rotated for successive 30 second periods until coloring consistent with the curing process was observed. The dried donuts were suspended on a metal stand using paper clips and placed in an oven to cure at 180° C. for 30 minutes. The LOI (loss on ignition), which was measured following heat treatment in an oven at 600° C. for 30 minutes and represents the quantity of binder solid applied on the mineral fibers was determined to be 4.08%.

An additional binder composition was prepared by diluting a commercial available sodium carboxymethylcellulose solution (NaCMC) comprising a molecular weight (MW) of approximately 40,000 (FINNFIX® 2, CP Kelco U.S. Inc./Huber, Atlanta, GA, USA) in water to a solids content concentration of 0.4%. Donuts were prepared as described above and fully cured in a microwave. The LOI was 1.36%.

To measure the tensile strength of the donut samples, the parting strength of each dry donut sample was determined using a testometric instrument. The parting strength corresponds to the total load at the breaking apart of a donut when pulled apart by the hook fixtures of the testometric machine. The donut samples comprising the ammonium citrate:dextrose based binder produced a tensile strength of 106.51 Newtons (N), while the donut samples comprising the NaCMC based binder produced a tensile strength of 111 N. The experimental NaCMC based binder was therefore found to perform comparably well in comparison with the standard ammonium citrate:dextrose based binder described herein.

Example 2. A standard binder composition capable of bonding glass fibers was prepared by mixing citric acid and a slight excess of ammonia in water, with the subsequent addition of dextrose to produce an ammonium citrate:dextrose weight ratio of 15:85. The solids concentrations of the binder composition was determined to be 3%. The binder composition was applied to a veil of glass mineral wool fibers by soaking the veil in a dip tray filled with the binder composition until complete saturation of the veil was achieved. Excess binder was removed via runoff and/or application of tissue paper to the veil. The binder saturated veil was then placed in a Mathis oven and cured at 200° C. for 8 minutes. The LOI was determined to be 13.02%. The resulting cured veil was cut into samples suitable for tensile strength testing using a testometric instrument.

An additional binder composition was prepared by diluting FINNFIX® 2, the above referenced sodium carboxymethylcellulose (NaCMC; MW of 40,000) in a sufficient volume of water to produce a solids concentration of 2%. The binder composition was applied to a glass veil as described above, and the binder-saturated veil was placed in a Mathis oven and cured at 200° C. for 8 minutes. The LOI was determined to be 12.00%. The resulting cured veil was cut into samples for tensile strength testing using a testometric instrument.

The cured veil samples were secured vertically within the rubber grip area of the grippers of the testometric machine to determine the dry tensile strength ("D") of the samples. A 50 kilogram (kg) load cell was applied and the machine was switched on. In order to test the weathered ("W") tensile strength of the samples, i.e. the tensile strength of the samples after autoclaving, the cured veil samples were loaded into an autoclave and subjected to an autoclave cycle comprising a sterilization temperature of 121° C., a holding time of 15 minutes and a 5 minute purge time. Following the autoclave cycle, the samples were withdrawn, dabbed with tissue paper and tested immediately for tensile strength on the testometric machine as described above. The tensile strength results are provided in the table below:

| Tensile Strength Test | Dextrose Ammonium Citrate Binder (3% solids) | FINNFIX® NaCMC Binder (2% solids) |
| --- | --- | --- |
| D | 84.68N | 72.42N |
| W | 62.47N | 58.43N |

Example 3. A standard binder composition as described in Example 2 was prepared, with the exception that the binder comprised a solids concentration of 5%. The standard binder composition was applied to rock mineral wool donuts in accordance with Example 1 and the samples were subsequently cured in accordance with Example 1. The LOI was determined to be 12.61%. The samples were then subjected to tensile strength testing as described above.

An experimental binder composition was prepared by diluting FINNFIX® 2 in a sufficient volume of water to produce a binder solids concentration of 3%. The resulting binder composition was applied to rock mineral wool donuts, cured and subjected to dry ("D") and wet ("W") tensile strength testing as described in Example 1. The LOI was determined to be 11.27%. The tensile strength test results are provided in the table below, which shows that the cellulose ether based binders of the present disclosure (NaCMC) beneficially demonstrate equal or better tensile strength at reduced concentrations as compared to the standard ammonium citrate/dextrose binder composition user for comparative analysis as described herein:

| Tensile Strength Test | Dextrose Ammonium Citrate Binder (5% solids) | FINNFIX® NaCMC Binder (3% solids) |
| --- | --- | --- |
| D | 210.78N | 325.25N |
| W | 87.07N (41.3%) | 157.65N (48.4%) |

Example 4. To determine the effectiveness of certain chemical additives for improving the dry strength recovery of the experimental binder compositions, the NaCMC based binder compositions of Example 2 were supplemented with 5 wt. %, 10 wt. % and 20 wt. % concentrations of ammonium sulfate, and the wet tensile strength ("W") testing described above was repeated after autoclaving and drying the compositions for two hours at ambient temperature ("autoclaving test"). In additional testing, the wet tensile strength of the samples was determined by soaking them for 10 minutes in a water bath at a temperature of 80° C. water bath, followed by drying the compositions for two hours at ambient temperature ("soaking test"). Following both the "autoclaving test" and "soaking test," the percentage strength recovery of the binders was measured. The results are summarized in the tables below:

| Wet Strength ("W") Soaking Test | |
| --- | --- |
| Additive | % Strength Recovery |
| 5% Ammonium Sulfate | 77.52% |
| 10% Ammonium Sulfate | 86.23% |

Wet Strength ("W") Soaking Test

| Additive | % Strength Recovery |
|---|---|
| 20% Ammonium Sulfate | 77.91% |

Wet Strength ("W") Autoclaving Test

| Additive | % Recovered after 2 hrs drying |
|---|---|
| 5% Ammonium Sulfate | 70.70% |
| 10% Ammonium Sulfate | 60.16% |
| 20% Ammonium Sulfate | 35.50% |

As shown in the tables above, the experimental binders advantageously exhibit strength recovery profiles that favorably compare to the approximately 80% recovery profile observed for 85 wt. % dextrose:15 wt. % ammonium citrate binders (results not shown).

Example 5. To determine the effects of incorporating urea into the disclosed binder compositions, FINNFIX® 2 was sufficiently diluted in water and in the absence of urea to produce a comparative binder comprising a solids concentration of 10%. The viscosity of the composition was measured in a Brookfield viscometer (AMETEK® Brookfield, Middleborough, MA, USA) using spindle S31. The results are shown in the table below, wherein spindle speed was observed to be inversely proportional to the resulting binder viscosity, i.e. an increase in spindle speed results in a lower binder viscosity:

| Rotations per minute | FINNSIX® 2 Binder Viscosity (cP) |
|---|---|
| 2.5 | 670 |
| 5 | 630 |
| 10 | 608 |
| 20 | 575 |
| 50 | 525 |

In a separate analysis, the above reference FINNFIX® 2 binder comprising a solids concentration of 10% was supplemented with urea at concentrations of 10%, 15%, 20% and 25% based on the weight of the bulk solution, i.e. a 25% urea binder composition was produced by adding 50 g of urea to 200 g FINNFIX® 2. The viscosity of the urea based binder compositions were likewise measured in a Brookfield viscometer (AMETEK® Brookfield, Middleborough, MA, USA) using spindle S31 and are presented in the table below. In certain embodiments exemplified in the table, the addition of urea advantageously reduces the viscosity of the experimental binder compositions versus the comparative binder solution results presented above.

| Rotations per minute | Standard 10% FINNFIX® 2 Binder Viscosity (cP) | 10% Urea Binder Viscosity (cP) | 15% Urea Binder Viscosity (cP) | 20% Urea Binder Viscosity (cP) | 25% Urea Binder Viscosity (cP) |
|---|---|---|---|---|---|
| 10 | 608 | 410 | 360 | 282 | 263 |
| 20 | 575 | 395 | 348 | 277 | 255 |
| 50 | 525 | 370 | 327 | 264 | 244 |

In addition experiments, the tensile strength of a urea based experimental binder composition was measured. A comparative binder composition of 10% FINNFIX® 2 (i.e., 20 g of FINNFIX® 2 in 180 g of water) comprising 2% solids exhibited a dry tensile strength of 63.34 N. An experimental binder composition comprising the comparative binder composition, with the exception of a 6% solids concentration and supplemented with 20 wt. % urea (based on the weight of the bulk solution as described above), beneficially exhibited an enhanced dry tensile strength of 88.63 N.

Example 6. To study the effects of amines on the viscosity of the experimental binder compositions of the instant disclosure, the viscosities of 1) a 10% FINNFIX® 2 comparative binder composition of Example 5 above ("standard FINNFIX® 2," comprising 2% solids); 2) a "standard FINNFIX® 2" binder composition comprising 10% 4-(aminomethyl)-1,8-octanediamine (based on a 2 g addition of the triamine 4-(aminomethyl)-1,8-octanediamine; "10% Triamine Binder"); and 3) a "standard FINNFIX® 2" binder composition comprising 20% 4-(aminomethyl)-1,8-octanediamine (based on a 4 g addition of 4-(aminomethyl)-1,8-octanediamine; "20% Triamine Binder") were measured in a Brookfield viscometer (AMETEK® Brookfield, Middleborough, MA, USA) using spindle S31 and are presented in the table below. As shown in the table below, the experimental binder composition comprising 10% 4-(aminomethyl)-1,8-octanediamine reduced viscosity by about 34%, while the 20% 4-(aminomethyl)-1,8-octanediamine binder composition produced minimal, additional viscosity reduction.

| Rotations per minute | Standard FINNFIX® 2 Binder Viscosity (cP) | 10% Amine Binder Viscosity (cP) | 20% Amine Binder Viscosity (cP) |
|---|---|---|---|
| 10 | 580 | 389 | 375 |
| 20 | 558 | 374 | 360 |
| 50 | 519 | 340 | 330 |

To determine the effects of a different amine on the experimental binder compositions, HMDA (hexamethylene diamine) was substituted for 4-(aminomethyl)-1,8-octanediamine at the same (10% and 20%) concentrations as described above ("10% HMDA Binder" and "20% HMDA Binder"). As shown in the table below, the 10% HMDA binder composition reduced viscosity by about 53%, while the 20% HMDA binder composition produced minimal, additional viscosity reduction.

| Rotations per minute | Standard FINNFIX ® 2 Binder Viscosity (cP) | 10% HMDA Binder Viscosity (cP) | 20% HMDA Binder Viscosity (cP) |
| --- | --- | --- | --- |
| 10 | 561 | 264 | 245 |
| 20 | 543 | 255 | 237 |
| 50 | 501 | 242 | 227 |

In further dry tensile strength analyses, it was determined that the use of either a diamine or a triamine appeared to have no significant effect. In addition, the effects of binder storage on viscosity were examined by storing the binder for 3 hours and subsequently measuring its viscosity for the various treatments ("rotations per minute") described in the previous table. It was determined that binder viscosity further decreased after 3 hours, with little difference observed after storage periods of longer than 3 hours.

| Rotations per minute | 20% HMDA Binder Viscosity (cP) |
| --- | --- |
| 10 | 188 |
| 20 | 184 |
| 50 | 183 |

The invention claimed is:

1. A composite product comprising mineral fibers bonded by a binder, wherein the binder is obtained upon curing an aqueous binder composition consisting of: (i) 0.2 to 15.0 wt. % (based on total aqueous binder composition) of one or more cellulose ethers; (ii) 0.5 to 30 wt. % (based on total aqueous binder composition) of a viscosity reducing agent selected from urea, biurea and thiourea, (iii) water; (iv) optionally one or more adjuvants selected from waxes, dyes, dedusters, release agents and/or catalysts, (v) optionally one or more wet strength improving additives selected from ammonium salts of inorganic acids and azetidinium compounds in a range of 0.5 to 20 wt. % (based on total aqueous binder composition), and (vi) optionally reaction products thereof.

2. The composite product of claim 1, wherein the one or more cellulose ethers are selected from alkyl cellulose, hydroxyalkyl cellulose and carboxyalkyl cellulose.

3. The composite product of claim 1, wherein the one or more cellulose ethers are selected from methyl cellulose, ethylcellulose, hydroxyethyl cellulose, hydroxypropyl cellulose, and sodium carboxymethyl cellulose.

4. The composite product of claim 1, wherein the one or more cellulose ethers contain a degree of substitution of hydroxyl groups in the range of 0.20 to 3.00.

5. The composite product of claim 1, wherein the one or more cellulose ethers comprise a molecular weight of 80000 Daltons or less.

6. The composite product of 1, wherein the composite product is a mineral wool insulation product.

7. A method of manufacturing a composite product, said method comprising providing an assembly of matter selected from comprising mineral fibers and mineral particles, applying an aqueous binder composition onto the assembly of matter, and subjecting the assembly of matter having the aqueous binder composition thereon to curing conditions, wherein the binder composition consists of: (i) 0.2 to 15.0 wt. % (based on total aqueous binder composition) of one or more cellulose ethers; (ii) 0.5 to 30 wt. % (based on total aqueous binder composition) of a viscosity reducing agent selected from urea, biurea and thiourea, (iii) water; (iv) optionally one or more adjuvants selected from waxes, dyes, dedusters, release agents and/or catalysts, (v) optionally one or more wet strength improving additives selected from ammonium salts of inorganic acids and azetidinium compounds in a range of 0.5 to 20 wt. % (based on total aqueous binder composition), and (vi) optionally reaction products thereof.

8. The method of claim 7,
wherein applying the binder composition onto the assembly of matter comprising mineral fibers comprises application selected from spraying, roll application, dipping, mixing and tumbling.

9. The method of claim 7, wherein the composite product is a mineral wool insulation product which comprises mineral fibers present in an amount ranging from 70% to 99% by total weight of the insulation product.

* * * * *